United States Patent Office 2,823,227
Patented Feb. 11, 1958

2,823,227
CHLOROANILINE SALTS OF α,α-DICHLOROPROPIONIC ACID

Charles T. Pumpelly, Midland, Mich., assignor to The Dow Chemical Company, Midland, Mich., a corporation of Delaware No Drawing. Application December 29, 1955
Serial No. 556,081

3 Claims. (Cl. 260—501)

This invention is concerned with the monochloroaniline salts of α,α-dichloropropionic acid having the following formula

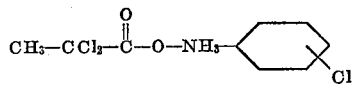

These new compounds are crystalline solid materials which are somewhat soluble in many organic solvents and of very high solubility in water. These compounds are active as herbicides and are adapted to be employed for the control of the growth and killing of weeds and for the sterilization of soil with regard to plant growth.

The new compounds may be prepared by reacting α,α-dichloropropionic acid with a monochloroaniline. In carrying out the reaction, the reactants may be added portionwise one to the other with stirring. In an alternative method, the reagents may be contacted in an organic solvent such as ether or benzene. Good results are obtained when operating at temperatures of from 0° to 60° C., and when employing substantially equimolecular proportions of the reactants. The reaction is exothermic, the temperature being controlled by regulating the rate of contacting the reactants and by external cooling. During the reaction, the α,α-dichloropropionic acid monochloroaniline salt separates in the reaction mixture as a crystalline solid. This product may be separated by filtration.

In a preferred method of operation, one molecular proportion of α,α-dichloropropionic acid is added slowly portionwise to one molecular proportion of the monochloroaniline dissolved in diethyl ether. The addition is carried out with stirring and cooling and at a temperature of from 0° to 60° C. Following the reaction, the mixture is filtered to separate the desired salt product.

The following examples illustrate the invention and are not to be construed as limiting:

Example 1

A quantity of α,α-dichloropropionic acid (143 grams, 1 mole) was added slowly portionwise to 127 grams (1 mole) of 3-chloroaniline dissolved in 300 milliliters of diethyl ether. The addition was carried out with stirring and cooling and at a temperature of 10° C. During the addition of α,α-dichloropropionic acid 3-chloroaniline salt separated in the reaction mixture as a crystalline solid. This product was separated by filtration, and the filtrate evaporated to dryness to obtain an additional quantity of the crystalline salt. The salt product was obtained in a yield of 94 percent and had a melting point of 119°–120.50° C.

Example 2

Equal molar quantities of α,α-dichloropropionic acid and 2-chloroaniline are reacted together as described in Example 1 to obtain an α,α-dichloropropionic acid 3-chloroaniline salt as a crystalline solid having a molecular weight of 280.

Example 3

One mole of α,α-dichloropropionic acid was added slowly portionwise to one mole of 4-chloroaniline dissolved in 400 milliliters of diethyl ether. The addition was carried out with stirring and cooling and at a temperature of from 10° to 20° C. During the addition an α,α-dichloropropionic acid 4-chloroaniline product separated in the reaction mixture as a crystalline solid. Following the reaction the salt product was separated by filtration and the filtrate evaporated to dryness to obtain an additional quantity of product. The α,α-dichloropropionic acid 4-chloroaniline salt was obtained in a yield of 95.5 percent and had a melting point of 110°–112° C.

The monochloroaniline salts of α,α-dichloropropionic acid are effective as plant growth control agents and are adapted to be employed for the killing of plants and the sterilization of soil with regard to plant growth. For such use the products may be dispersed on a finely divided carrier and employed as dusts. Also, the new products may be employed in oils and as constituents of aqueous compositions.

The highly desirable and beneficial results to be obtained with the compounds of the present invention are illustrated as follows. Aqueous compositions containing 0.04 pound of the aniline and 3-chloroaniline salts of α,α-dichloropropionic acid were employed for the control of the growth of the germinant seeds and emerging seedlings of pigweed, lambsquarters and wild buckwheat. In such operations, the compositions were applied to seed beds as a soil drench and at a rate of about 0.4 acre inch of aqueous composition per acre to supply dosage of five pounds of one of the salt compounds per acre. Immediately prior to the applications, the seed beds had been prepared and seeded with the named plant species. Other seed beds similarly seeded were left untreated to serve as checks.

After three weeks, the treated beds were examined to ascertain what control of the growth of seeds and emerging seedlings had been obtained. The examination indicated a 90 percent control of lambsquarters and a 100 percent control of pigweed and wild buckwheat has been obtained in the beds treated with the 3-chloroaniline salt of α,α-dichloropropionic acid. In the beds treated with the aniline salt of α,α-dichloropropionic acid a zero percent control of the growth of the seeds and emerging seedlings of the named plant species was obtained. At the time of the observations, the untreated check beds were found to support abundant and vigorously growing stands for lambsquarters, pigweed and wild buckwheat.

I claim:

1. A monochloroaniline salt of α,α-dichloropropionic acid of the formula

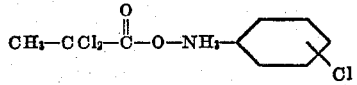

2. The 3-chloroaniline salt of α,α-dichloropropionic acid.

3. The 4-chloroaniline salt of α,α-dichloropropionic acid.

References Cited in the file of this patent

UNITED STATES PATENTS

| | | |
|---|---|---|
| 2,393,086 | Bosquet | Jan. 5, 19.. |
| 2,673,877 | Thompson | Mar. 30, 19.. |
| 2,689,262 | Scoles | Sept. 14, 19.. |